May 2, 1967 C. D. BARNES ETAL 3,317,408

METHOD OF MAKING A MAGNETIC CORE STORAGE DEVICE

Filed June 11, 1963

3 Sheets-Sheet 1

INVENTORS
CREIGHTON D. BARNES
JOSEPH M. SHAHEEN

BY A. M. Fernandez

ATTORNEY

May 2, 1967 C. D. BARNES ETAL 3,317,408

METHOD OF MAKING A MAGNETIC CORE STORAGE DEVICE

Filed June 11, 1963

3 Sheets-Sheet 2

INVENTORS
CREIGHTON D. BARNES
JOSEPH M. SHAHEEN

BY A. M. Fernandez

ATTORNEY

METHOD OF MAKING A MAGNETIC CORE STORAGE DEVICE

Filed June 11, 1963

3 Sheets-Sheet 3

INVENTORS
CREIGHTON D. BARNES
JOSEPH M. SHAHEEN

BY

A. M. Fernandez

ATTORNEY

3,317,408
METHOD OF MAKING A MAGNETIC CORE STORAGE DEVICE

Creighton D. Barnes, Garden Grove, and Joseph M. Shaheen, Whittier, Calif., assignors to North American Aviation, Inc.

Filed June 11, 1963, Ser. No. 286,998
2 Claims. (Cl. 204—15)

ABSTRACT OF THE DISCLOSURE

A method for producing toroidal magnetic cores under minimum stress conditions having an electroplated single turn winding through the aperture of each core. The core or a plurality of cores, is positioned between conductor materials disposed on top of an insulative laminant substrate. A soft resin is inserted between the core and the insulative laminant to act as a cushion for the core for minimizing stresses on the core.

This invention relates to magnetic core storage devices and to a method of their fabrication.

The rectangular hysteresis loop properties of magnetic cores are widely known and employed for fabricating binary storage devices. A basic core storage device consists of a matrix of toroidal cores arranged in rows and columns. All cores in a given row are wired by a common conductor to provide a single turn winding through each core. Similarly, all cores in a given column are wired by a common conductor. The two sets of conductors are referred to as the X and Y drive windings.

To store a binary 1 in a selected core of a typical storage device, the X and Y drive winding which coincide at the selected core are each energized with a current of half the magnitude necessary to set the core to the one state. All of the other cores wired by the energized X and Y drive windings are disturbed but not set to the one state since each is subjected to a magnetomotive force of half the value necessary to set it to the one state.

To read the binary digit stored in a selected core, the X and Z drive windings which coincide at the selected core are each energized with half the current required to change the state of the selected core but in a direction opposite to that for storing a binary digit 1. If the selected core is storing a binary digit 0, it is not disturbed by the coincident currents. However, if a binary digit 1 is stored in the selected core, the state of the core is shifted from one stable state to its other stable state. The change is then sensed by a third winding commonly referred to as a sense winding.

A single matrix of magnetic cores may be employed to store or read only one binary digit at a time since only one set of X and Y drive windings may be energized at the same time. Accordingly, to provide a magnetic core storage device capable of handling groups of binary digits simultaneously or in parallel, a plurality of such magnetic core matrices often called core planes must be provided, one for each binary digit of a group to be stored or read out in parallel.

In such a three-dimensional arrangement for parallel storing and reading a group of binary digits, the corresponding X and Y drive lines of each core plane are connected in series to corresponding X and Y drive amplifiers. The separate sense winding provided in each plane senses the magnetic flux in its plane of the selected core as it is shifted from one state to the other upon reading out a binary digit 1 stored therein.

To store a group of digits in the same memory location or group of cores, one in each plane, currents are passed through the X and Y drive windings in directions opposite the current directions for reading. However, the coincident currents through the corresponding cores of each plane in the three-dimensional array would switch all cores to the one state. To inhibit the storage of a binary digit 1 in the cores of selected planes, an inhibit winding is provided in each plane through which current is selectively driven in a direction opposite to either one of the coincident currents in the X and Y windings.

In the past, magnetic core planes have been fabricated by manually passing the separate windings through the apertures of the cores. That method of fabrication is not only expensive but also unsuitable for microminiaturized systems because the compactness desired in a microminiaturized system is most difficult if the windings must be provided manually.

There have been some attempts in the past to fabricate magnetic core planes using printed circuit techniques. In one such attempt, the apertures through toroidal cores encapsulated in a plate of insulating material have been divided into four quadrants by etching through insulating material in the aperture of each core. The resulting set of four isolated apertures in each core is then employed to plate through the four separate windings required. Such a method of fabricating a core memory plane does not achieve the maximum microminiaturization possible with photographic techniques in developing printed circuits since the cores would require an inside diameter of at least 0.03 inch with an outside diameter of approximately 0.05 inch. In order to be able to use smaller cores having an inside diameter of about 0.018 inch and an outside diameter of about 0.03 inch, it would be desirable to employ a method of fabrication which does not require separating the apertures through the cores into quadrants or sectors.

In another attempt to use printed circuit techniques for fabricating a magnetic core plane, cylindrical coaxially spaced and insulated conductors have been manually formed and inserted into the apertures of encapsulated magnetic cores. Although that method does not separate the apertures in the cores into quadrants for the separate windings, maximum microminiaturization is again not achieved since cores having a relatively large inside diameter of 0.03 inch or greater are required in order to be able to manually place the preformed, cylindrical conductors in the cores before proceeding with the process of printing circuits interconnecting the separate cylindrical conductors of the cores as required.

An object of this invention is to provide an improved multilayer printed circuit magnetic core storage device.

Another object is to provide an improved method for fabricating a magnetic core storage device.

A further object is to provide an improved method of fabricating a magnetic core storage device which does not require manually passing electrical conductors through apertures in the cores.

Still another object is to provide an improved method of fabricating a more compact magnetic core storage device than has heretofore been possible.

These and other objects of the invention are achieved by using photographic techniques to etch holes in a copper clad sheet or board of insulating material into which magnetic cores are deposited in an array of rows and columns. After the cores are fixed in place with a suitable adhesive, such as epoxy, the wall of the aperture through each core is electroplated from the copper sheet on one side of the board to the copper sheet on the other side, leaving a copper plated aperture. A first set of windings are then etched in the copper sheets such that a given winding for one row of cores passes back and forth from one side of the board to the other through the apertures in the cores. The first set of windings, including the electroplated walls forming cylindrical conductors through the apertures in the cores, are then coated with an insulating material, leaving an insulated aperture. Thereafter, the insulated board is electroplated to produce the next set of windings in a similar manner. The entire process employed for the second set of windings is repeated for a third set of windings. If a fourth set of windings is to be provided for the inhibit function, the process is again repeated as for the third set of windings.

Other objects and advantages of the invention will become apparent from the following description with reference to the drawings in which.

Figure 1:
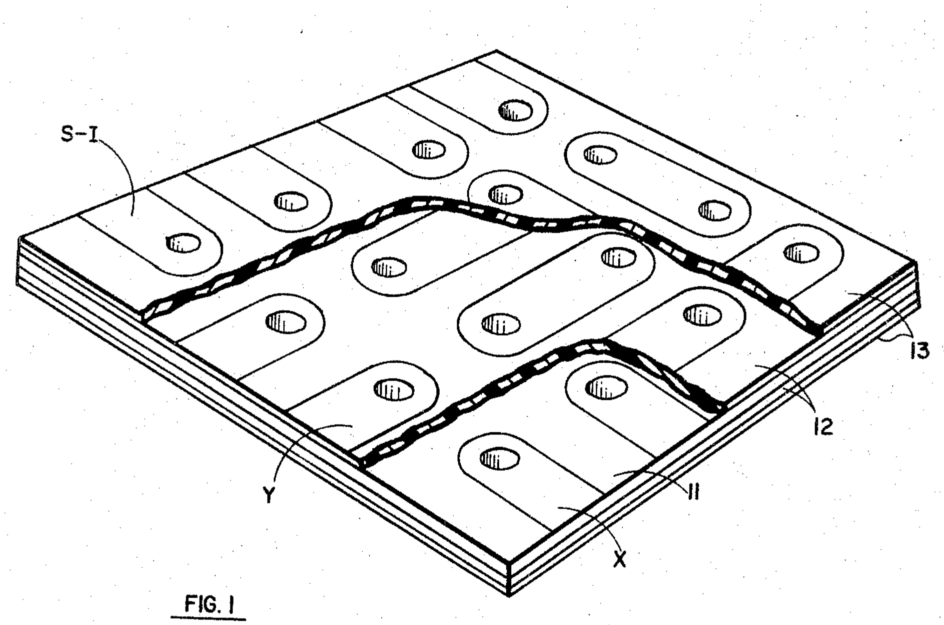
FIG. 1 is a perspective view, partly broken away, of a portion of a storage device fabricated in accordance with the present invention.
Figure 4:
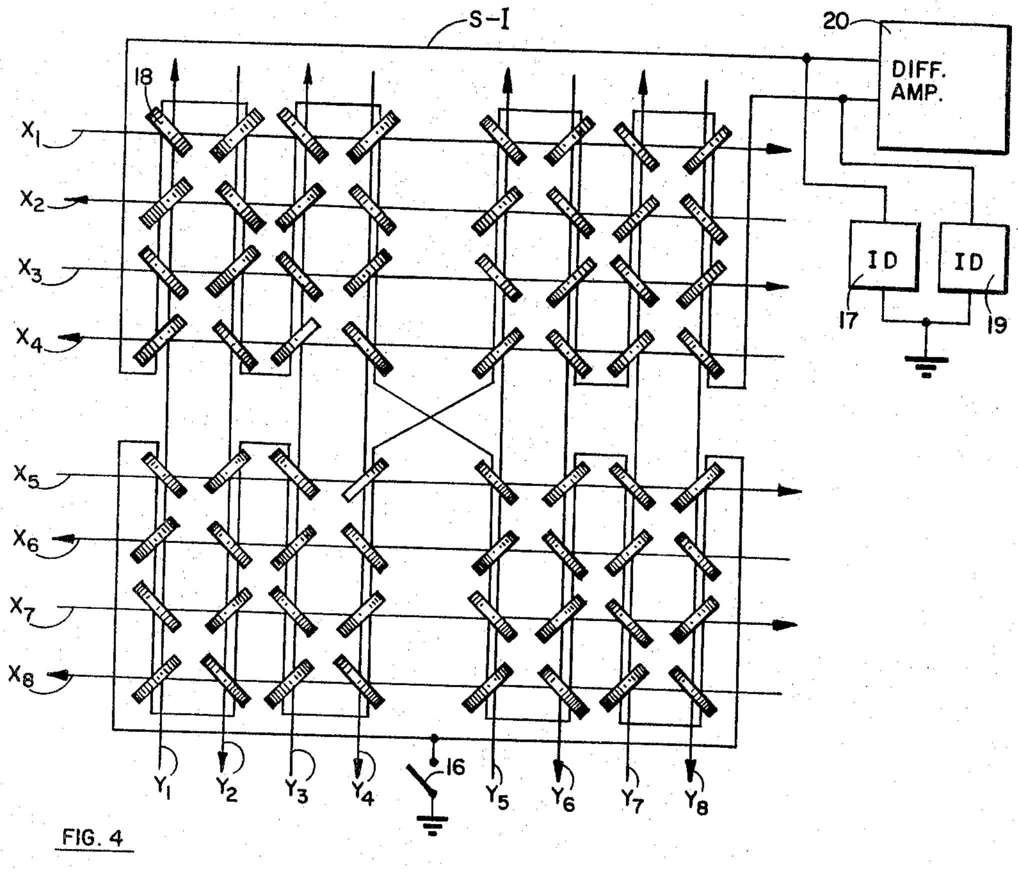
Figure 5:
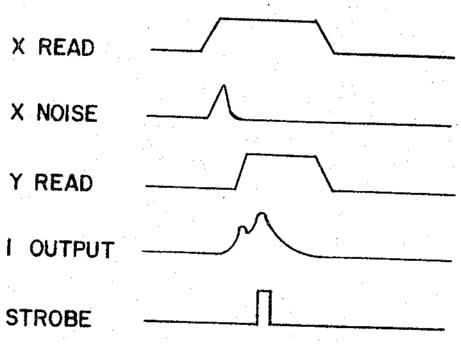

FIGS. 3*a* to 3*f* pictorially illustrate basic steps in the process for fabricating the magnetic core storage device of FIG. 1;

FIG. 4 is a schematic diagram of the arrangement of windings for a magnetic core storage device;

FIG. 5 is a timing diagram for the storage device of FIG. 4; and

Figure 6:
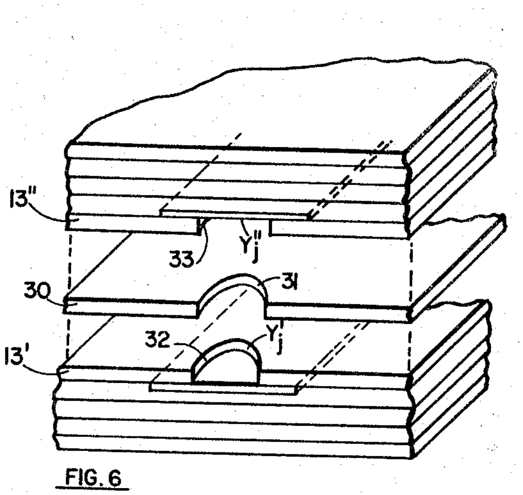

FIG. 6 illustrates the manner in which core windings of adjacent core planes may be interconnected to form a three-dimensional core storage device.

Figure 2:
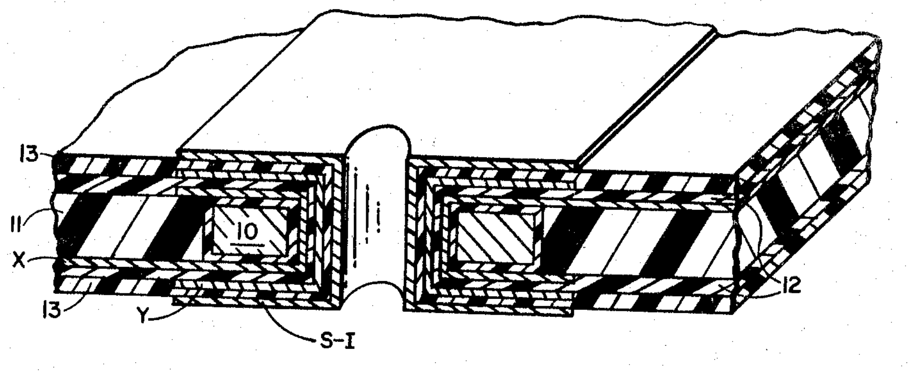
FIG. 2 is a perspective view of a section of one core in the device of FIG. 1.

A magnetic core storage device which may be employed as at least part of a core plane is shown in FIG. 1 as comprising sixteen cores 10 (one of which is shown in FIG. 2) arranged in rows and columns. The cores are embedded in a board 11 of insulating material, such as epoxy-impregnated glass fibre cloth, and wired by three sets of windings: a set of Y-drive windings etched on both sides of the board 11; a set of X-drive windings etched on a film or coating 12 of insulating material on each side of the board and through the core apertures; and a third winding S–I, which may be used as a common sense-inhibit winding. The winding S–I is etched on each side of the board on a film or coating 13 of insulating material, and, like the X and Y windings, effectively wired back and forth from one side of the board 11 to the other by electroplated conductors through the apertures of the cores 10. FIG. 2 shows in a cross section of a typical core the manner in which the electroplated interconnections through the centers of the cores are insulated from the core and from each other.

The magnetic storage device of FIG. 1 is illustrated as having a common sense and inhibit winding S–I so that only three insulated interconnections need be electroplated through the apertures of the cores, but separate sense and inhibit windings may be provided if desired by adding a fourth winding. FIG. 4 shows a preferred pattern, which forms no part of this invention, for the windings of a 64-bit storage device having a common sense and inhibit winding S–I. The arrows on the X and Y windings indicate the direction of currents during the operation of reading a binary digit in a core selected by the conventional coincident-current method.

The center 15 of the S–I winding is connected to ground by a switch 16 during a store operation in order that a current may be driven through a selected half thereof in a direction which will oppose the Y-select drive current when a binary digit 0 is to be stored in the core addressed by the X and Y windings. For example, if a digit 1 is not to be stored in the location $X_1$, $Y_1$ during a store operation, the switch 16 is closed and a bipolar inhibit driver 17 is actuated to drive current in the S–I winding down through the selected core 18 in a selected direction to oppose the half-select current in the $Y_1$ winding.

It should be noted that only the inhibit driver 17 is actuated while storing a binary digit 0 in a core located in the second and fourth coordinate quadrants, to provide current of one polarity for the second quadrant and of the opposite polarity for the fourth quadrant. A bipolar inhibit driver 19 is provided for the first and third quadrants. In that manner only half the normal power is required for the inhibit function during a store operation.

If the binary digit to be stored in the core addressed by X and Y windings is 1, and not 0, neither one of the inhibit drivers is actuated. The logic equations for selectively actuating the respective inhibit drivers 17 and 19 are:

$$+I_{19} \text{ in 1st quadrant} = A_3'A_6M_1'$$
$$-I_{19} \text{ in 3d quadrant} = A_3A_6'M_1'$$
$$-I_{17} \text{ in 2d quadrant} = A_3A_6M_1'$$
$$+I_{17} \text{ in 4th quadrant} = A_3'A_6'M_1'$$

where currents $+I_{17}$ and $+I_{19}$ are to ground from inhibit drivers 17 and 19, respectively; positions $A_1$ to $A_3$ of an address register A are decoded to select one of the X windings $X_1$ to $X_8$; positions $A_4$ to $A_6$ of the address register are decoded to select one of the Y windings; and $M_1$ is the binary digit from the memory register M to be stored in the selected core.

During a read operation the switch 16 is left open so that when the X and Y drive currents switch a selected core, a voltage is induced in the S–I winding which is connected to a differential amplifier 20. Cancellation of induced noise signals from the unselected cores in the column of the selected core is achieved by the unique pattern of the S–I winding. For instance, to read the core 18, the $Y_1$ winding is energized by a drive current in the direction indicated. The induced noise signals which result at the disturbed half-selected cores of the same column have a polarity opposite the $Y_1$ drive current as indicated by the arrows opposite each core. The selected core 18 is switched and therefore is not to be considered in the noise cancellation scheme. By tracing the S–I winding from the upper to the lower input terminal of the differential amplifier, it is seen that three half-select noise signals are added to the desired output signal from the switched core 18 and four half-select noise signals are subtracted, thereby cancelling the half-select noise signal from all of the disturbed cores except one. The signal translated to an output terminal 21 is $$V = V_o - V_n \pm V_\delta$$

where:

$V_o$=output voltage of the selected core 18;

$V_n$=average half-select output voltage of an unselected core, the polarity of which is opposite the output voltage of the selected core; and $V_\delta$=the difference between the average of the positive half-select output voltages and the average of the negative half-select output voltages.

In a typical memory core, $V_o$ for a binary digit 1 is a minimum of 50 mv., $V_n$ is a maximum of 3 mv., and $V_\delta$ is approximately .2 mv. Accordingly, in a 64-bit memory plane, the output voltage V for a digit 1 is approximately 45±.02 mv. The maximum $V_o$ for a binary digit 0 would be 5 mv., so that the output voltage V for a digit 0 is approximately 2±.02 mv.

It should be noted that since the S–I winding is also to be used for the inhibit function, no cancellation of half-select noise signals from the disturbed cores in the row of the selected core is provided. Accordingly, to avoid introducing that noise in the desired output signal, the selected X winding is energized first. After the noise signals from the disturbed cores have subsided, the selected Y winding is energized and the output of the differential amplifier 20 is strobed. FIG. 5 illustrates the relative timing of the signals.

The method of fabricating the laminated multilayer circuits for the storage device of FIG. 1 is pictorially illustrated in FIGS. 3*a* to 3*f*. It should be understood that the drawings are intended to illustrate only the method; accordingly, the dimensions in the various figures are not to be considered as being proportional.

For the first step, the board 11 of epoxy-impregnated glass fibre clad on both sides with sheets of copper 21 and 22 is first cleaned in a solution of hydrochloric acid, rinsed in deionized water, and coated with a photo-sensitive emulsion. The emulsion may be deposited by flow techniques and allowed to dry in an oven at about 110° C. for approximately 10 minutes. Thereafter, the photo-sensitive emulsion is exposed on both sides to a source of ultraviolet light, such as a mercury vapor lamp, using a photographic positive of the pattern of holes desired for the cores 10 of FIG. 1 arranged in rows and columns. The hole pattern is then developed and etched through the copper plates with ferric chloride ($FeCl_3$). The holes of that pattern are approximately .020 in. in diameter for cores of .030 in. outside diameter.

It should be noted that the solution of ferric chloride will not dissolve the epoxy-impregnated glass fibre of the board 11.

Although other materials are available for the insulating board 11, it is preferred that the material be selected from a class consisting of glass, epoxy resin, polyester, polyurethane, terephthalate and combinations thereof because each may be readily etched with a sulfuric acid, except glass which may be readily etched with a hydrofluoric acid solution. Combinations of those materials such as the epoxy impregnated glass fibre selected to illustrate the invention may be readily etched with a combination of sulfuric and hydrofluoric acids in solution.

Figure 3A:
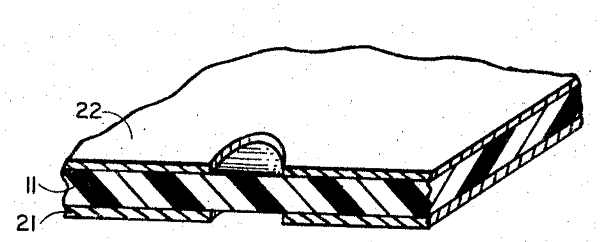
Figure 3B:
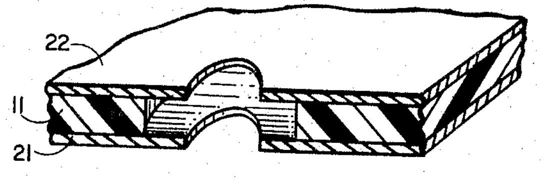

The next step depicted in FIG. 3*b* is to etch holes through the insulating board 11 with a solution of one part by volume of 70 percent hydrofluoric acid and two parts of 96 percent sulfuric acid. That solution is selected because it will not dissolve the copper sheets 21 and 22 in the time necessary to etch through the insulating board 11. In that manner the etched copper sheets 21 and 22 function as masks of acid-resist material while holes are etched through the insulating board 11.

It should be noted that the holes etched through the insulating board 11 are wider than the holes etched in the copper sheets 21 and 22. The undercutting beneath the sheets of copper 21 and 22 is due to the chemical etching process which tends to proceed at a uniform rate from the center of the masking holes in the copper sheets.

More uniform holes are etched in the board 11 by ultrasonically agitating the etching solution. The exact diameter of the etched holes in the insulating material is selected to be .033 to .035 in. and can be achieved to the tolerance required by controlling the etching time.

Figure 3C:
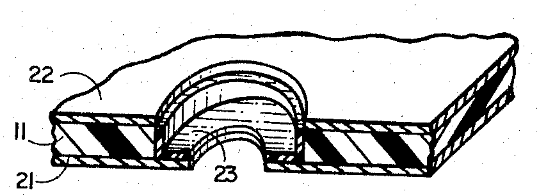

The undercut portion of the sheet 22 is removed in the next step depicted in FIG. 3*c* by completely masking the sheet 21, including the holes, with plastic tape and immersing the board in an etching solution of ferric chloride which is ultrasonically agitated at a frequency of about 80 kilocycles per second. Since the undercut portion of the sheet 21 around each hole is exposed to the ultrasonically agitated etching solution on three sides, the undercut portion or fringe of the copper sheet 22 is quickly etched away while the remaining exposed surface of the sheet 22 and the inner portion of the sheet 21 are only slightly etched.

Figure 3D:
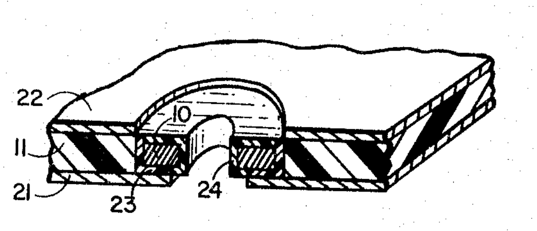

Before placing a core 10 in each hole etched into the insulating board 11 the copper sheets 21 and 22 are masked on both sides with a soluble solution, such as polyvinyl alcohol, and the holes are impregnated with an insulating adhesive, such as epoxy, so that when the cores are placed in the holes a film of electrical insulation 23 is provided between the cores and the supporting undercut fringe of the sheet 21. After the cores are placed in the holes, the adhesive is cured in an oven and the cores in the holes are encapsulated as shown in FIG. 3*d* with a suitable insulating compound 24, such as epoxidized polyols or the compounds disclosed in a copending application Ser. No. 248,206 filed by R. A. Skiff on Dec. 31, 1962, and assigned to the assignee of this application. Excess encapsulating compound in the core apertures is drawn out through a suitable screen by a vacuum pump.

Figure 3E:
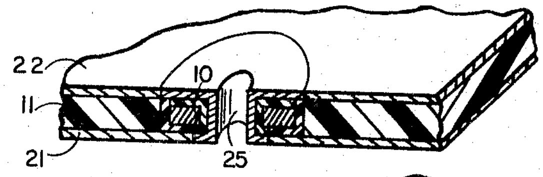

Surfaces of the copper clad board 11 with encapsulated cores 10 are then cleaned before proceeding to the next step illustrated in FIG. 3*e* in order to remove from the surfaces of the copper sheets 21 and 22 any epoxy deposited thereon, either while the holes were being impregnated with adhesive or the cores were being encapsulated.

Once the surfaces of the copper sheets are clean, a first conductor 25 is provided through the aperture of each encapsulated core by first an electroless copper plating process followed by an electroplating process. The electroless copper plating process is employed to provide a first electrical circuit from one copper sheet to the other which is required for the electroplating process. The electroplating process is then employed to plate the holes through the encapsulated cores to a desired thickness of approximately .00075 inch. The board 11 with the encapsulated cores is now ready for the first pattern of conductors to be etched for the X windings.

Figure 3F:
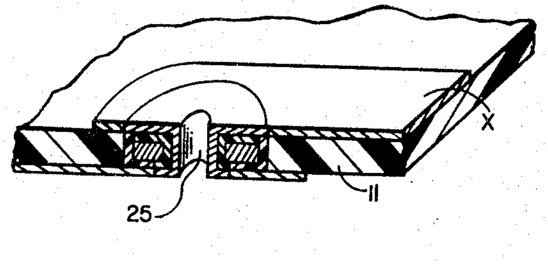

The next step of etching the first pattern of conductors depicted in FIG. 3*f* is accomplished by using standard photo techniques for producing printed circuits which is by first coating the copper sheets 21 and 22 with a photo-sensitive emulsion. A photographic positive of the first pattern of conductors is then exposed on both sides to ultraviolet light and developed, thereby exposing copper in the desired pattern. Next the desired pattern of copper is gold plated, including the electroplated conductors through the apertures of the cores. The developed photo resist is then removed and the copper around the gold plated pattern etched with a solution of ferric chloride, using the plated gold as a mask. Other materials and processes could, of course, be used to provide the mask, depending upon the etching solution to be employed. The array of cores with the X windings thus provided is then insulated with a thin film of insulating material, such as epoxy, before proceeding with the steps necessary to fabricate the Y windings illustrated in FIG. 1.

To proceed with the development of the Y windings, the insulated array of cores with the X windings is coated with an adhesive, such as uncured epoxy. Copper is then electroless plated on both sides of the insulated board and through the insulated apertures of the cores. The electroless plated surfaces are then electroplated with copper to a thickness of approximately .00075 inch.

Before etching the next pattern of conductors for the Y windings in the electroplated surfaces of the board, the entire board is placed in an oven to cure the adhesive coating on which the electroless copper was deposited in order to assure a more perfect bond of the electroplated copper to the board. The pattern of conductors for the Y windings is then gold plated and etched in the same manner as for the X windings.

The pattern of conductors for the S–I winding is provided in the same manner as for the pattern of conductors for the Y winding. If a separate inhibit winding is to be employed, a fourth pattern of conductors may be provided by repeating the process employed to provide the second and third patterns of windings.

To provide a three-dimensional storage device, as many core memory planes are fabricated as required in accordance with the foregoing novel method and laminated together with insulating material such as epoxy-impregnated glass fibre. The X and Y windings are then connected in series such that a given winding $X_i$ or $Y_j$ links all cores in one row $i$ or column $j$ of all planes. In that manner corresponding cores in all planes may be addressed by energizing only two windings. FIG. 6 illustrates one way of connecting the winding $Y_j'$ of one plane with the winding $Y_j''$ of another plane.

The material 30 employed to laminate two planes together provides electrical insulation between the third pattern of conductors which is the S–I winding in the illustration of FIG. 1.

A notch 31 is cut or etched on the edge of the insulating material 30 (FIG. 6) to correspond with notches 32 and 33 etched in the insulating films 13' and 13'' to expose the windings $Y_j'$ and $Y_j''$ which are to be connected together. After the planes are laminated together, the walls of the notches are first electroless plated and then electroplated. Following that, the electroplated notches may be filled with a conductive alloy, such as a eutectic of gallium and indium mixed with gold in equal proportions by weight. The alloy is pressed into the notches while in a plastic state, then allowed to harden. In that manner a redundant connection from one plane to the other is provided by the alloy fill. Interconnections with the next plane are similarly made along the opposite side. The X windings are also interconnected in a similar manner, but along the remaining two sides.

External connections to the S–I windings of each plane, and the X and Y windings of the laminated planes are made to tabs soldered, brazed or otherwise connected to the windings at the edges of the planes as required.

Although the invention has been described and illustrated in detail, it is to be understood that the invention is not limited thereto since many modifications may be made in the materials and processes employed. Accordingly, the appended claims are to be limited only to the true spirit and scope of the invention.

What is claimed is:

1. A method of fabricating a magnetic core storage device having a plurality of toroidal magnetic cores disposed in a plane and an electroplated single turn winding through the aperture of each core comprising preparing a clean board of insulating material having top and bottom sheets of electrically conductive material laminated to opposite sides thereof, depositing a first coat of photosensitive emulsion on both sheets of conductive material and photo-exposing said first coat of emulsion on both sheets through a photographic positive of a pattern of desired holes where cores are to be deposited, thereby hardening the emulsion around said pattern of desired holes in said top and bottom sheets, removing the unexposed emulsion with a suitable solvent and etching said pattern of desired holes through said top and bottom sheets of conductive material with a first etching solution which will not materially dissolve the hardened emulsion and said insulating material, removing the hardened photosensitive emulsion and etching each of said desired holes through said insulating material, to a larger diameter than the etched holes through said top and bottom sheets of conductive material, with a second etching solution which will not materially dissolve the conductive material, thereby using said top and bottom sheets of conductive material having the desired pattern of holes etched therethrough as a mask, etching the holes in the top sheet of conductive material to the same diameter as the holes through the insulating material, thereby providing uniform holes through the top sheet and the insulating material and smaller holes through the bottom sheet to provide an annular protruding portion in the bottom of the hole through the insulating material, coating the inside of the holes through the insulating material and the protruding annular portion of the bottom sheet of each hole with a non-conductive adhesive, depositing a core in each hole through said insulating material, said core having a larger outside diameter and a smaller inside diameter than the corresponding hole through the bottom sheet, covering each deposited core with a non-conductive encapsulating material, thereby providing a plane of encapsulated cores, each core having an insulated aperture, electroplating conductive paths through said insulated core apertures from said top sheet to said bottom sheet to provide thereby electroplated apertures, and etching a pattern of conductive paths in said top and bottom sheets of conductive material, each electroplated aperture being surrounded by a conductive path on each side thereof, to provide a single turn winding through each core.

2. A method of fabricating a magnetic core storage device having a plurality of toroidal magnetic cores disposed in a plane and a plurality of electroplated single turn windings through the aperture of each core comprising preparing a clean board of insulating material having top and bottom sheets of electrically conductive material laminated to opposite sides thereof, depositing a first coat of photosensitive emulsion on both sheets of conductive material and photo-exposing said first coat of emulsion on both sheets through a photographic positive of a pattern of desired holes where cores are to be deposited, thereby hardening the emulsion around said pattern of desired holes in said top and bottom sheets.

removing the unexposed emulsion with a suitable solvent and etching said pattern of desired holes through said top and bottom sheets of conductive material with a first etching solution which will not materially dissolve the hardened emulsion and said insulating material, removing the hardened photosensitive emulsion and etching each of said desired holes through said insulating material to a larger diameter than the etched holes through said top and bottom sheets of conductive material with a second etching solution which will not materially dissolve the conductive material, thereby using as a mask said top and bottom sheets of conductive material having the desired pattern of holes etched therethrough, etching the holes in the top sheet of conductive material to the same diameter as the holes through the insulating material, thereby providing uniform holes through the top sheet and the insulating material, and leaving a protruding annular portion of said bottom sheet, coating each of said holes through the insulating material and the protruding annular portion of said bottom sheet in each hole with a non-conductive adhesive, depositing a core in each hole through said insulating material, said core having a larger outside diameter and a smaller inside diameter than the corresponding hole through the bottom sheet, covering said cores in said holes with a non-conductive encapsulating material to provide a plane of encapsulated cores, each core having an insulated aperture, electroplating conductive paths through said insulated core apertures from the top sheet to the bottom sheet to provide thereby electroplated apertures, etching a first pattern of conductive paths in said top and bottom sheets of conductive material, each electroplated aperture being surrounded by a conductive path on each side thereof to provide a first single turn winding through each core, coating said electroplated apertures and said first pattern of conductive paths on both sides of said plane with insulating material, thereby providing an insulated plane having single turn windings through insulated apertures thereof, electroplating a conductive film on both sides of said insulated plane and through said insulated apertures, and etching a second pattern of conductive paths in said conductive film on both sides of said plane to provide a single turn winding through each core.

References Cited by the Examiner

UNITED STATES PATENTS

| | | | |
|---|---|---|---|
| 2,496,689 | 5/1949 | Gresham | 204—113 |
| 2,848,359 | 8/1958 | Talmy | 204—15 |
| 2,872,391 | 2/1959 | Hauser et al. | 204—15 |
| 3,130,134 | 4/1964 | Jones | 204—15 |
| 3,265,546 | 8/1966 | Medford | 156—2 |

FOREIGN PATENTS

| | | |
|---|---|---|
| 962,702 | 12/1949 | France. |

JOHN H. MACK, *Primary Examiner.*

T. TUFARIELLO, *Assistant Examiner.*